(12) United States Patent
Zhao et al.

(10) Patent No.: US 11,881,582 B2
(45) Date of Patent: Jan. 23, 2024

(54) POSITIVE ELECTRODE ACTIVE MATERIAL AND PREPARATION METHOD THEREOF, SECONDARY BATTERY, AND ELECTRIC APPARATUS

(71) Applicant: CONTEMPORARY AMPEREX TECHNOLOGY CO., LIMITED, Ningde (CN)

(72) Inventors: Dong Zhao, Ningde (CN); Qi Wu, Ningde (CN); Qiang Chen, Ningde (CN); Jingpeng Fan, Ningde (CN); Jing Wang, Ningde (CN); Na Liu, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/323,423

(22) Filed: May 25, 2023

(65) Prior Publication Data

US 2023/0299276 A1  Sep. 21, 2023

Related U.S. Application Data

(63) Continuation of application No. PCT/CN2021/142491, filed on Dec. 29, 2021.

(51) Int. Cl.
*H01M 4/36* (2006.01)
*H01M 4/04* (2006.01)
(Continued)

(52) U.S. Cl.
CPC ......... *H01M 4/366* (2013.01); *H01M 4/0471* (2013.01); *H01M 4/587* (2013.01);
(Continued)

(58) Field of Classification Search
None
See application file for complete search history.

(56) References Cited

FOREIGN PATENT DOCUMENTS

| CN | 101901898 A | 12/2010 |
| CN | 102723487 A | 10/2012 |

(Continued)

OTHER PUBLICATIONS

International Search Report received in the corresponding International Application PCT/CN2021/142491, dated Aug. 26, 2022.

*Primary Examiner* — Tracy M Dove
(74) *Attorney, Agent, or Firm* — Kilpatrick Townsend & Stockton LLP

(57) ABSTRACT

A positive electrode active material and a preparation method thereof, a secondary battery, and an electric apparatus are provided. The positive electrode active material in the present invention includes: a core, where the core is a lithium-containing phosphate; a first coating layer disposed on at least part of surface of the core, where the first coating layer is a carbon coating layer co-doped with titanium and nitrogen; and a second coating layer disposed on at least part of surface of the first coating layer, where the second coating layer includes $Li_{1+x}M_xTi_{2-x}(PO_4)_3$, where M is at least one element selected from aluminum, lanthanum, indium, zirconium, gallium, and scandium, and $0.2 \leq x \leq 0.8$. With use of the positive electrode active material of the present invention, a high discharge capacity, excellent rate performance, and excellent cycling performance can be achieved.

20 Claims, 1 Drawing Sheet

(51) Int. Cl.
*H01M 4/58* (2010.01)
*H01M 4/587* (2010.01)
*H01M 4/02* (2006.01)

(52) U.S. Cl.
CPC .... *H01M 4/5825* (2013.01); *H01M 2004/021* (2013.01); *H01M 2004/028* (2013.01)

(56) References Cited

FOREIGN PATENT DOCUMENTS

| | | | |
|---|---|---|---|
| CN | 102893432 A | 1/2013 | |
| CN | 104124437 A | 10/2014 | |
| CN | 106299366 A | 1/2017 | |
| CN | 108598383 A | 9/2018 | |
| CN | 109461894 A | 3/2019 | |
| CN | 111435737 A | 7/2020 | |
| CN | 112614979 A | 4/2021 | |
| CN | 113471411 A | 10/2021 | |
| EP | 3096376 A1 | 11/2016 | |

POSITIVE ELECTRODE ACTIVE MATERIAL AND PREPARATION METHOD THEREOF, SECONDARY BATTERY, AND ELECTRIC APPARATUS

CROSS REFERENCE TO RELATED APPLICATIONS

The present application is a continuation of International Application PCT/CN2021/142491, filed Dec. 29, 2021 and entitled "POSITIVE ELECTRODE ACTIVE MATERIAL AND PREPARATION METHOD THEREOF, SECONDARY BATTERY, AND ELECTRIC APPARATUS", the entire disclosure of which is incorporated herein by reference.

TECHNICAL FIELD

This application relates to the field of lithium battery technologies, and in particular, to a positive electrode active material and a preparation method thereof, a secondary battery, and an electric apparatus.

BACKGROUND

In recent years, with the constant development of lithium-ion battery technologies, lithium-ion batteries have been widely used in energy-storage power systems such as hydroelectric, thermal, wind, and solar power plants, as well as power tools, electric bicycles, electric motorcycles, electric vehicles, military equipment, aerospace, and other fields.

At present, lithium-ion secondary batteries mainly include lithium iron phosphate batteries, lithium manganate oxide batteries, lithium cobalt oxide batteries, and ternary batteries containing nickel, cobalt, and manganese elements. Among these batteries, lithium iron phosphate batteries have advantages such as high safety and high cycling stability, and therefore, are increasingly widely applied.

However, with lithium iron phosphate as a positive electrode material, the lithium iron phosphate battery has a low lithium-ion diffusion coefficient and a low electronic conductivity, and experiences serious capacity loss at high rates during charging and discharging. Therefore, the discharge capacity, rate performance, and cycling performance still need to be improved for lithium iron phosphate used as a positive electrode material.

SUMMARY

The present invention is proposed in view of the foregoing problems found in lithium iron phosphate used as a positive electrode material, and aims to provide a positive electrode active material with a core-shell structure that helps achieve a high discharge capacity, excellent rate performance, and excellent cycling performance, a preparation method thereof, a secondary battery, and an electric apparatus.

To achieve this purpose, this application provides a positive electrode active material and a preparation method thereof, a secondary battery, and an electric apparatus.

A first aspect of this application provides a positive electrode active material, including: a core, where the core is a lithium-containing phosphate; a first coating layer disposed on at least part of surface of the core, where the first coating layer is a carbon coating layer co-doped with titanium and nitrogen; and a second coating layer disposed on at least part of surface of the first coating layer, where the second coating layer includes $Li_{1+x}M_xTi_{2-x}(PO_4)_3$, where M is at least one element selected from aluminum, lanthanum, indium, zirconium, gallium, and scandium, and $0.2 \leq x \leq 0.8$.

Therefore, the positive electrode active material in the first aspect of this application has a core-shell structure, and the lithium-containing phosphate core, a carbon coating layer co-doped with titanium and nitrogen, specifically the first coating layer, and a coating layer of $Li_{1+x}M_xTi_{2-x}(PO_4)_3$, specifically the second coating layer are sequentially disposed from the core to the outer layer.

Disposed between the core and the second coating layer, the first coating layer is flexible, and is better compatible with a solid electrolyte after being doped with titanium, to serve as a buffer layer and reduce solid-solid interface impedance. In addition, the first coating layer used as the buffer layer features good electronic and ionic conductivity and can further improve transmission capability of lithium ions and electrons, thereby improving the electrochemical performance of the positive electrode material. As the first coating layer, the carbon coating layer, when doped with titanium, can also reduce resistivity of the positive electrode material while improving mechanical properties of the positive electrode material. Co-doped with nitrogen, the carbon coating layer can further improve the electronic and ionic conductivity of the positive electrode material. As the second coating layer, the coating layer of $Li_{1+x}M_xTi_{2-x}(PO_4)_3$ is a solid electrolyte which has low ion diffusion resistance, good chemical compatibility, and stable electrochemical performance, thereby effectively improving the ionic conductivity of a material and reducing the occurrence of side reactions between the positive electrode material and an electrolyte. Therefore, a battery using the positive electrode active material in the first aspect of this application can have a high discharge capacity, excellent rate performance, and excellent cycling performance.

In a preferable embodiment, the lithium-containing phosphate includes at least one of compounds represented by $LiA_yB_{1-y}PO_4$, where A is one or more of iron, nickel, cobalt, or manganese, B is one or more of vanadium, copper, molybdenum, titanium, tungsten, zinc, yttrium, zirconium, or magnesium, and $0.8 \leq y \leq 1$.

Therefore, the positive electrode material used as the core is $LiAPO_4$ or a lithium-containing phosphate obtained by replacing part of A with B. These lithium-containing phosphates are positive electrode materials for lithium-ion batteries, providing excellent performance such as good cycling stability, good safety, light weight, and environmental friendliness.

In a preferable embodiment, in the first coating layer, a molar ratio of titanium, nitrogen, and carbon is 1:(2.5-5):(6-16), optionally 1:(3-4.5):(8-14).

Therefore, when the molar ratio of titanium, nitrogen, and carbon in the first coating layer is within the foregoing range, the first coating layer used as the buffer layer has more excellent performance, and can further reduce the resistivity of the positive electrode material, and improve the mechanical property as well as the electronic and ionic conductivity of the positive electrode material.

In a preferable embodiment, M is at least one element selected from indium, gallium, and scandium.

Therefore, when M for the second coating layer is the foregoing element and x is within the foregoing range, the second coating layer can have lower ion diffusion resistance, better chemical compatibility, and more stable electrochemical performance.

In a preferable embodiment, a mass ratio of the core, the first coating layer and the second coating layer is 1:(0.2-0.5):(0.3-0.7).

Therefore, when the mass ratio of the core, the first coating layer, and the second coating layer is within the foregoing range, the positive electrode active material in the first aspect of this application can have excellent electrochemical performance.

In a preferable embodiment, a thickness of the first coating layer is 5 nm-20 nm, optionally 8 nm-15 nm, and/or a thickness of the second coating layer is 10 nm-60 nm, optionally 15 nm-50 nm.

Therefore, when the thicknesses of the first coating layer and the second coating layer are within the foregoing ranges, the positive electrode active material in the first aspect of this application can have excellent electrochemical performance.

In a preferable embodiment, a median particle size $D_v50$ of the positive electrode active material is 0.25 µm-0.85 µm, optionally 0.35 µm-0.65 µm.

Therefore, when the positive electrode active material has regular particle morphology and uniform particle size distribution, a tap density of the positive electrode active material can be increased, thereby helping increase a volume specific capacity of a battery.

In a preferable embodiment, a tap density of the positive electrode active material is 1.2 g/cm$^3$-1.4 g/cm$^3$, optionally 1.25 g/cm$^3$-1.35 g/cm$^3$.

Therefore, the positive electrode active material in the first aspect of this application has a high tap density so that a battery using the positive electrode active material has a high energy density.

In a preferable embodiment, a specific surface area of the positive electrode active material is 8 m$^2$/g-12 m$^2$/g, optionally 9 m$^2$/g-10 m$^2$/g.

Therefore, the positive electrode active material in the first aspect of this application has an appropriate specific surface area so that a battery using the positive electrode active material has good cycling performance and rate performance.

A second aspect of this application provides a preparation method of the positive electrode active material in the first aspect of this application. The method includes the following steps: step S1: letting a lithium salt, a phosphate compound, an A salt, and optionally a B salt react in a solution; step S2: dispersing a titanium-containing compound and a nitrogen-containing organic compound into the solution obtained in step S1 for a polymerization reaction; step S3: adding a titanium-containing compound, the phosphate compound, and an M salt after the polymerization reaction in step S2 ends, and when the solution becomes a suspension, adding the lithium salt and stirring continuously; and step S4: completely evaporating solvent in the reaction system, grinding a resulting product, and sintering the resulting product in an inert atmosphere to obtain the positive electrode active material. The positive electrode active material includes: a core, where the core is a lithium-containing phosphate; a first coating layer disposed on at least part of surface of the core, where the first coating layer is a carbon coating layer co-doped with titanium and nitrogen; and a second coating layer disposed on at least part of surface of the first coating layer, where the second coating layer includes $Li_{1+x}M_xTi_{2-x}(PO_4)_3$, where M is at least one element selected from aluminum, lanthanum, indium, zirconium, gallium, and scandium, and 0.2≤x≤0.8.

Therefore, the method in the second aspect of this application can be used to synthesize the positive electrode active material in the first aspect of this application. The first coating layer (carbon coating layer co-doped with titanium and nitrogen) of the positive electrode active material in this application is prepared by sintering a polymer that is formed through in-situ polymerization of monomers and that has high electric conductivity and strong charge storage capability. The second coating layer (a coating layer of $Li_{1+x}M_xTi_{2-x}(PO_4)_3$) is prepared by sintering a liquid-phase in-situ coating at a high temperature, and provides a more uniform coating than a conventional solid-phase ex-situ coating using a given compound and a tighter bond between the coating and the positive electrode material. The positive electrode active material in the first aspect of this application that is prepared in the method in the second aspect of this application has the foregoing excellent performance.

In a preferable embodiment, in step S1, pH of an aqueous solution of the lithium salt, the phosphate compound, the A salt, and optionally the B salt is adjusted to 4-6, and an oxidizing agent and a complexing agent are added to the aqueous solution for reaction. Optionally, the A salt is one or more of a sulfate, a nitrate, or a chloride of iron, nickel, cobalt, or manganese. Optionally, the B salt is one or more of a nitrate, a chloride, or an acetate of vanadium, copper, molybdenum, titanium, tungsten, zinc, yttrium, zirconium, or magnesium. Optionally, the phosphate compound is one or more of phosphoric acid, ammonium dihydrogen phosphate, and diammonium hydrogen phosphate. Optionally, the lithium salt is one or more of lithium oxalate, lithium hydroxide, and lithium acetate.

Therefore, in step S1, the foregoing core represented by $LiA_yB_{1-y}PO_4$ can be synthesized.

In a preferable embodiment, in step S2, the titanium-containing compound is ammonium titanyl oxalate; and optionally, the nitrogen-containing organic compound is a combination of one or more of pyrrole, aniline, and vinylpyrrolidone.

Therefore, a titanium-doped polymer coating layer can be formed in situ through a polymerization reaction of organic monomers, and after subsequent sintering and carbonization, a uniform carbon coating layer (the first coating layer) co-doped with titanium and nitrogen can be obtained on the surface of the material, which effectively improves ionic conductivity performance of the lithium-containing phosphate material. In addition, the carbon coating layer (the first coating layer) is flexible, and can form a proper buffer layer between the subsequent second coating layer and the core.

In a preferable embodiment, in step S2, a molar ratio of the titanium-containing compound and the nitrogen-containing organic compound is 1:(1-2.5); and/or time for the polymerization reaction is 3-8 hours.

Therefore, the first coating layer (carbon coating layer co-doped with titanium and nitrogen) with excellent performance can be formed.

In a preferable embodiment, in step S3, the M salt is at least one of a nitrate, a chloride, or an acetate of aluminum, lanthanum, indium, zirconium, gallium or scandium; and/or the phosphate compound is a combination of one or more of phosphoric acid, ammonium dihydrogen phosphate, and diammonium hydrogen phosphate; and/or the titanium-containing compound is ammonium titanyl oxalate, and the lithium salt is a combination of one or more of lithium oxalate, lithium hydroxide, and lithium acetate.

Therefore, a titanium-containing compound, a phosphate compound, and the M salt can be added to the solution to form a coating layer of $M_xTi_{2-x}(PO_4)_3$ in situ, and then a dense solid electrolyte coating layer of $Li_{1+x}M_xTi_{2-x}(PO_4)_3$ is formed on the surface of the material during the subsequent sintering process. The coating layer can effectively improve the ionic conductivity performance of the lithium-containing phosphate material and further reduce the occurrence of side reactions between the lithium-containing phosphate material and an electrolyte.

In a preferable embodiment, in step S3, a molar ratio of lithium, titanium, phosphorus and M element in the lithium salt, titanium-containing compound, phosphate compound and M salt is (1.2-1.8):(1.2-1.8):(3-4):(0.2-0.8); and/or time for the reaction is 5-10 hours.

Therefore, the second coating layer (a coating layer of $Li_{1+x}M_xTi_{2-x}(PO_4)_3$) with excellent performance can be formed.

In a preferable embodiment, in step S4, the inert atmosphere is $N_2$ or Ar.

Therefore, sintering can be performed in a common inert atmosphere.

In a preferable embodiment, in step S4, a sintering condition is to maintain at 400-600° C. for 4-6 hours, then heat to 700-800° C. and maintain for 10-15 hours.

Therefore, a positive electrode active material synthesized by the sintering process has regular morphology and high crystallinity, and the coating layer and the matrix (the core) are closely bonded, so that the positive electrode active material has good structural stability, ensuring that the positive electrode active material has a high capacity, excellent rate performance, and excellent cycling performance.

A third aspect of this application provides a secondary battery, including the positive electrode active material in the first aspect of this application or the positive electrode active material prepared in the method in the second aspect of this application.

Therefore, with the positive electrode active material in the first aspect of this application used, the secondary battery in the third aspect of this application has a high capacity, excellent rate performance, and excellent cycling performance.

A fourth aspect of this application provides an electric apparatus, including the secondary battery in the third aspect of this application.

Therefore, with the secondary battery in the third aspect of this application used, the electric apparatus in the fourth aspect of this application can be used properly for a long time.

EFFECTS OF THE PRESENT INVENTION

The present invention can provide the positive electrode active material with the core-shell structure that helps achieve a high discharge capacity, excellent rate performance, and excellent cycling performance, the preparation method of the positive electrode active material, the secondary battery, and the electric apparatus.

Figure 1:
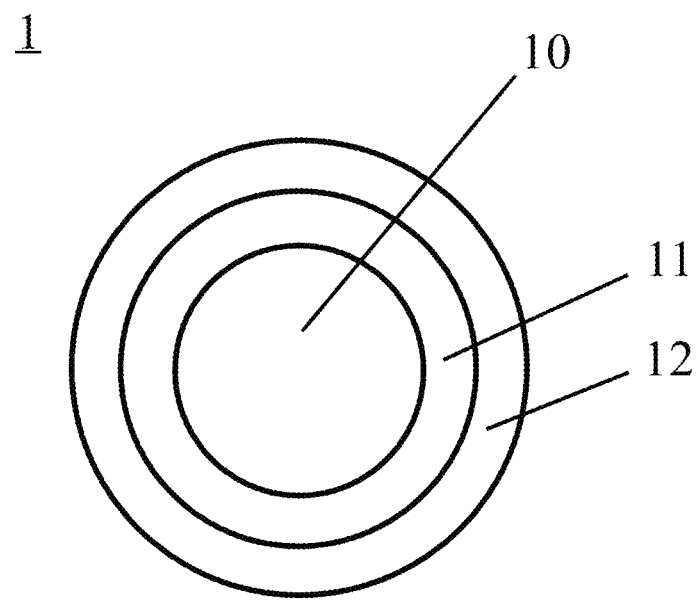
FIG. 1 is a schematic structural diagram of layers of a positive electrode active material in the present invention.
Figure 2:
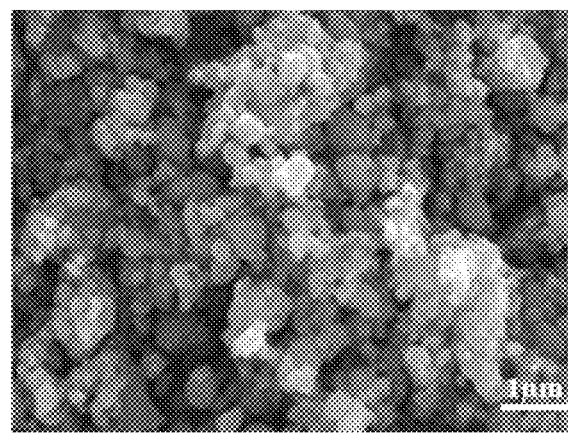
FIG. 2 is a scanning electron microscope (SEM) image of a positive electrode active material prepared according to Example 2 of the present invention.

REFERENCE SIGNS 1. positive electrode active material; 10. core; 11. first coating layer; and 12. second coating layer.

DESCRIPTION OF EMBODIMENTS

The following specifically discloses embodiments of a positive electrode active material and a preparation method thereof, a secondary battery, and an electric apparatus in this application, with proper reference to accompanying drawings. However, there may be cases where unnecessary detailed descriptions are omitted. For example, a detailed description of a well-known matter or a repeated description of an actually identical structure may be omitted. This is to avoid unnecessary redundancy and to facilitate understanding by a person skilled in the art. In addition, the accompanying drawings and the following description are provided for a person skilled in the art to fully understand this application, but are not intended to limit the subject described in the claims.

"Ranges" disclosed in this application are defined in the form of lower and upper limits, and a given range is defined by selecting a lower limit and an upper limit, where the selected lower and upper limits define the boundaries of the particular range. Ranges defined in this manner may be inclusive or exclusive of limiting values, and the limiting values may be randomly paired, that is, any lower limit may be paired with any upper limit to form a range. For example, if ranges 60-120 and 80-110 are listed for a particular parameter, it is also predictable to construe the ranges as 60-110 and 80-120. In addition, if 1 and 2 are listed as the minimum range values, and 3, 4, and 5 are listed as the maximum range values, the following ranges are all predictable: 1-3, 1-4, 1-5, 2-3, 2-4 and 2-5. In this application, unless otherwise stated, the numerical range "a-b" represents an abbreviated representation of any combination of real numbers between a and b, where both a and b are real numbers. For example, the numerical range "0-5" means that all real numbers between "0-5" are listed herein, and "0-5" is just an abbreviated representation of the combinations of these numerical values. In addition, when a parameter is expressed as an integer greater than or equal to 2, this is equivalent to that the parameter is, for example, an integer of 2, 3, 4, 5, 6, 7, 8, 9, 10, 11, 12, and the like.

Unless otherwise specified, all the embodiments and optional embodiments in this application may be combined to form a new technical solution.

Unless otherwise specified, all the technical features and optional features in this application may be combined to form a new technical solution.

Unless otherwise specified, all the steps in this application may be performed sequentially or randomly, and preferably performed sequentially. For example, the method includes steps (a) and (b), indicating that the method may include steps (a) and (b) performed sequentially, or steps (b) and (a) performed sequentially. For example, if the method further includes step (c), this means that step (c) may be added to the method in any sequence. For example, the method may include steps (a), (b), and (c), steps (a), (c), and (b), steps (c), (a), and (b), or the like.

Unless otherwise specified, "comprise" and "include" mentioned in this application may be exclusive or inclusive. For example, "comprise" and "include" may comprise or include other components not listed, or may comprise or include only the listed components.

In this application, a term "or" is inclusive unless otherwise specified. For example, a phrase "A or B" means "A, B, or both A and B". More specifically, any of the following conditions satisfies the condition "A or B": A is true (or present) and B is false (or not present); A is false (or not present) and B is true (or present); or both A and B are true (or present).

A battery using a positive electrode material prepared from a lithium-containing phosphate such as lithium iron phosphate has advantages such as high safety and high cycling stability, and therefore, is increasingly widely applied in the traction battery field. To improve discharge capacity, rate performance, cycling performance, and the like of the positive electrode material, a coating layer is usually formed on an outer surface of the positive electrode material.

The inventors have found that when a coating layer is formed in a solid phase coating method, the coating layer is prone to problems such as non-uniform coating and incomplete coating. As a result, a coated positive electrode material has mediocre performance. When a solid phase coating method is used to form a solid electrolyte coating layer, for example, a lithium titanium phosphate coating layer, the solid electrolyte coating layer is in direct contact with the surface of the positive electrode material. High contact resistance is likely to form on a solid-solid interface, and therefore, interface compatibility is poor and a transmission capability of lithium ions is weak. This limits exertion of electrical properties and improvement of the electrical conductivity performance of the material.

Therefore, the inventors have proposed that a coating layer is formed by sintering a liquid phase in-situ coating at a high temperature, so that the coating is more uniform and the coating layer is bonded with the positive electrode material more closely. In addition, a buffer layer is formed between the positive electrode material and a solid electrolyte layer applied on the surface of the positive electrode material, which are compatible with the buffer layer. This can improve interface compatibility and reduce contact resistance. In addition, the buffer layer has good electronic and ionic conductivity, which can further improve the transmission capability of lithium ions and electrons, thereby improving the electrochemical performance of the material.

To achieve the foregoing purposes, after repeatedly researches, the inventors of this application have found that: when the method of sintering a liquid phase in-situ coating at a high temperature is used to form a positive electrode material using lithium-containing phosphate to serve as a core, a carbon coating layer co-doped with titanium and nitrogen that is applied on the outer surface of the core, and a solid electrolyte layer, for example, a lithium titanium phosphate coating layer, which is applied on the outer surface of the carbon coating layer, the carbon coating layer is compatible with both the positive electrode material and the solid electrolyte layer and can serve as a buffer layer. Therefore, solid-solid interface impedance is reduced. In addition, the carbon coating layer co-doped with titanium and nitrogen used as the buffer layer features good electronic and ionic conductivity and can further improve the transmission capability of lithium ions and electrons, thereby improving the electrochemical performance of the positive electrode material.

Positive Electrode Active Material

The following details a positive electrode active material 1 in this application.

In an embodiment of this application, as shown in FIG. 1, the positive electrode active material 1 includes: a core 10, where the core 10 is a lithium-containing phosphate; a first coating layer 11 disposed on at least part of surface (preferably on the entire surface) of the core 10, where the first coating layer 11 is a carbon coating layer co-doped with titanium and nitrogen; and a second coating layer 12 disposed on at least part of surface (preferably on the entire surface) of the first coating layer 11, where the second coating layer 12 includes $Li_{1+x}M_xTi_{2-x}(PO_4)_3$, where M is at least one element selected from aluminum, lanthanum, indium, zirconium, gallium, and scandium, and $0.2 \leq x \leq 0.8$.

The positive electrode active material 1 in this application has a core-shell structure, and sequentially includes the lithium-containing phosphate as the core 10, a carbon coating layer co-doped with the titanium and nitrogen as the first coating layer 11, and the solid electrolyte coating layer of $Li_{1+x}M_xTi_{2-x}(PO_4)_3$ as the second coating layer 12 from the inside to the outside.

The lithium-containing phosphate that constitutes the core 11 is the most preferable and promising positive electrode material for lithium-ion batteries in the industry, and has excellent performance such as good cycling stability, good safety, light weight, and environmental friendliness. However, the battery has a low lithium-ion diffusion coefficient and a low electronic conductivity, and experiences serious capacity attenuation at high rates during charging and discharging. Therefore, a coating layer needs to be formed on the outer surface of the positive electrode material to improve a capacity, rate performance, and cycling performance.

The first coating layer 11 is disposed on at least part of surface (preferably the entire surface) of the core 10. In the first coating layer 11, titanium and nitrogen exist in the form of titanium oxycarbide or titanium carbonitride, achieving good electrical conductivity and chemical stability. Doped with titanium, the first coating layer 11 is compatible with both the core 10 and the second coating layer 12, to serve as a buffer layer and reduce solid-solid interface impedance. In addition, the first coating layer 11 used as the buffer layer features good electronic and ionic conductivity and can further improve transmission capability of lithium ions and electrons, thereby improving the electrochemical performance of the material. When doped with titanium, the carbon coating layer can reduce resistivity of the positive electrode material while improving mechanical properties of the positive electrode material. Co-doped with nitrogen, the carbon coating layer can further improve the electronic and ionic conductivity of the positive electrode material.

The second coating layer 12 is disposed on at least part of surface (preferably the entire surface) of the first coating layer 11, and the second coating layer 12 includes $Li_{1+x}M_xTi_{2-x}(PO_4)_3$, where M is at least one element selected from aluminum, lanthanum, indium, zirconium, gallium, and scandium, and $0.2 \leq x \leq 0.8$. The second coating layer 12 as a solid electrolyte has low ion diffusion resistance, good chemical compatibility, and stable electrochemical performance, thereby effectively improving the ionic conductivity of a material and reducing the occurrence of side reactions between the material and an electrolyte.

A layered structure (the core 10, the first coating layer 11, and the second coating layer 12) of the positive electrode active material 1 in this application, as well as chemical composition of each layer can be confirmed in a well-known method. For example, the layered structure can be confirmed by using a transmission electron microscopy and the chemical composition of each layer can be confirmed by an elemental scanning analysis.

In some embodiments, the lithium-containing phosphate includes at least one of compounds represented by $LiA_yB_{1-y}PO_4$, where A is iron, nickel, cobalt, or manganese, B is one or more of vanadium, copper, molybdenum, titanium, tungsten, zinc, yttrium, zirconium, or magnesium, and $0.8 \leq y \leq 1$.

Therefore, the positive electrode material used as the core 10 is $LiAPO_4$ or a lithium-containing phosphate obtained by replacing part of A with B. These lithium-containing phosphates are positive electrode materials for lithium-ion batteries, providing excellent performance such as good cycling stability, good safety, light weight, and environmental friendliness.

In some embodiments, in the first coating layer 11, a molar ratio of titanium, nitrogen, and carbon is 1:(2.5-5):(6-16), optionally 1:(3-4.5):(8-14).

Therefore, when the molar ratio of titanium, nitrogen, and carbon in the first coating layer 11 is within the foregoing range, the first coating layer 11 can further reduce the resistivity of the positive electrode material, and improve the mechanical properties as well as the electronic and ionic conductivity of the positive electrode material. As a buffer layer, the first coating layer has more excellent performance.

In some embodiments, M is at least one element selected from indium, gallium, and scandium.

Therefore, when M in the second coating layer 12 is the foregoing element and x is within the foregoing range, the second coating layer 12 can have lower ion diffusion resistance, better chemical compatibility, and more stable electrochemical performance.

In some embodiments, a mass ratio of the core 10, the first coating layer 11 and the second coating layer 12 is 1:(0.2-0.5):(0.3-0.7).

Therefore, when the mass ratio of the core 10, the first coating layer 11, and the second coating layer 12 is within the foregoing range, the positive electrode active material 1 in this application can have excellent electrochemical performance.

In some embodiments, a thickness of the first coating layer 11 is 5 nm-20 nm, optionally 8 nm-15 nm, and/or a thickness of the second coating layer 12 is 10 nm-60 nm, optionally 15 nm-50 nm.

The thicknesses of the first coating layer 11 and the second coating layer 12 can be measured in a well-known method.

Therefore, when the thicknesses of the first coating layer 11 and the second coating layer 12 are within the foregoing ranges, the positive electrode active material 1 in this application can have excellent electrochemical performance.

In some embodiments, in a preferable embodiment, a median particle size $D_v50$ of the positive electrode active material 1 is 0.25 μm-0.85 μm, optionally 0.35 μm-0.65 μm.

The median particle size $D_v50$ of the positive electrode active material 1 can be measured in a well-known method.

Therefore, when the positive electrode active material 1 has regular particle morphology and uniform particle size distribution, a tap density of the positive electrode active material can be increased, thereby helping increase a volume specific capacity of a battery.

In some embodiments, a tap density of the positive electrode active material 1 is 1.2 $g/cm^3$-1.4 $g/cm^3$, optionally 1.25 $g/cm^3$-1.35 $g/cm^3$.

The tap density of the positive electrode active material 1 can be measured in a well-known method.

The positive electrode active material 1 has a high tap density so that a battery using the positive electrode active material 1 has a high energy density.

In some embodiments, a specific surface area of the positive electrode active material 1 is 8 $m^2/g$-12 $m^2/g$, optionally 9 $m^2/g$-10 $m^2/g$.

The positive electrode active material 1 has an appropriate specific surface area so that a battery using the positive electrode active material 1 provides good cycling performance and rate performance.

The specific surface area of the positive electrode active material 1 can be measured in a well-known method.

Therefore, the positive electrode active material 1 in this application has an appropriate tap density and specific surface area so that a battery using the positive electrode active material provides a high energy density, and good cycling performance and rate performance.

Preparation Method of Positive Electrode Active Material

An embodiment of this application provides a preparation method of the positive electrode active material 1 in this application. The method includes the following steps: step S1: letting a lithium salt, a phosphate compound, an A salt, and optionally a B salt react in a solution (for example, an aqueous solution), preferably at pH 4-6 in the presence of an oxidizing agent and a complexing agent; step S2: dispersing a titanium-containing compound (for example, a water-soluble titanium-containing compound) and a nitrogen-containing organic compound into the solution obtained in step S1 for a polymerization reaction; step S3: adding a titanium-containing compound (for example, a water-soluble titanium-containing compound), the phosphate compound, and an M salt after the polymerization reaction in step S2 ends, and when the solution becomes a suspension, adding the lithium salt and stirring continuously; step S4: completely evaporating solvent in the reaction system, grinding a resulting product, and sintering the resulting product in an inert atmosphere to obtain the positive electrode active material 1. The positive electrode active material 1 includes: a core 10, where the core 10 is a lithium-containing phosphate; a first coating layer 11 disposed on at least part of surface of the core 10, where the first coating layer 11 is a carbon coating layer co-doped with titanium and nitrogen; and a second coating layer 12 disposed on at least part of surface of the first coating layer 11, where the second coating layer 12 includes $Li_{1+x}M_xTi_{2-x}(PO_4)_3$, where M is at least one element selected from aluminum, lanthanum, indium, zirconium, gallium, and scandium, and $0.2 \leq x \leq 0.8$.

The foregoing method can be used to synthesize the positive electrode active material 1. The first coating layer 11 (a carbon coating layer co-doped with titanium and nitrogen) and the second coating layer 12 (a coating layer of $Li_{1+x}M_xTi_{2-x}(PO_4)_3$) of the positive electrode active material 1 are both formed by sintering a liquid-phase in-situ coating. Specifically, the first coating layer 11 is made by sintering a polymer that is formed through in-situ polymerization of monomers and that has high electric conductivity and strong charge storage capability. The second coating layer 12 is made by sintering a liquid-phase in-situ coating at a high temperature. The positive electrode active material 1 in the present invention provides a coating more uniform than a conventional solid-phase ex-situ coating from a given compound and a tighter bond between the coating and the positive electrode material.

In some embodiments, in step S1, the A salt is one or more of a sulfate, a nitrate, or a chloride of iron, nickel, cobalt, or manganese; and/or the B salt is one or more of a nitrate, a chloride, or an acetate of vanadium, copper, molybdenum, titanium, tungsten, zinc, yttrium, zirconium, or magnesium; and/or the phosphate compound is one or more of phosphoric acid, ammonium dihydrogen phosphate, and diammonium hydrogen phosphate; and/or the lithium salt is one or more of lithium oxalate, lithium hydroxide, and lithium acetate.

Therefore, in step S1, the core 10 represented by $LiA_yB_{1-y}PO_4$ can be synthesized.

The oxidizing agent and the complexing agent in step S1 may be a conventional oxidizing agent and complexing agent. For example, the oxidizing agent may be at least one of hydrogen peroxide and sodium peroxide, and the complexing agent may be at least one of citric acid, polyacrylic acid, n-propanol and isopropyl. The reaction time is not limited, for example, 2-5 hours, provided that the reaction completely ends.

In some embodiments, in step S2, the titanium-containing compound is ammonium titanyl oxalate; and optionally, the nitrogen-containing organic compound is a combination of one or more of pyrrole, aniline, and vinylpyrrolidone.

Therefore, a titanium-doped polymer coating layer can be formed in situ through a polymerization reaction of organic monomers, and after subsequent sintering and carbonization, a uniform carbon coating layer (the first coating layer 11) co-doped with titanium and nitrogen can be obtained on the surface of the material, which effectively improves ionic conductivity performance of the lithium-containing phosphate material. In addition, the carbon coating layer (the first coating layer 11) is flexible, and can form a proper buffer layer between the subsequent second coating layer 12 and the core 10.

In some embodiments, in step S2, a molar ratio of the titanium-containing compound and the nitrogen-containing organic compound is 1:(1-2.5); and/or time for the polymerization reaction is 3-8 hours.

Therefore, the first coating layer 11 (a carbon coating layer co-doped with titanium and nitrogen) with excellent performance can be formed.

In some embodiments, in step S3, the M salt is at least one of a nitrate, a chloride, or an acetate of aluminum, lanthanum, indium, zirconium, gallium or scandium; and/or the phosphate compound is a combination of one or more of phosphoric acid, ammonium dihydrogen phosphate, and diammonium hydrogen phosphate; and/or the titanium-containing compound is ammonium titanyl oxalate, and the lithium salt is a combination of one or more of lithium oxalate, lithium hydroxide, and lithium acetate.

Therefore, a titanium-containing compound, a phosphate compound, and the M salt can be added to the solution to form a coating layer of $M_xTi_{2-x}(PO_4)_3$ in situ, and then a dense solid electrolyte coating layer of $Li_{1+x}M_xTi_{2-x}(PO_4)_3$ is formed on the surface of the material during the subsequent sintering process. The coating layer can effectively improve the ionic conductivity performance of the lithium-containing phosphate material and further reduce the occurrence of side reactions between the lithium-containing phosphate material and an electrolyte.

In some embodiments, in step S3, a molar ratio of lithium, titanium, phosphorus and M element in the lithium salt, titanium-containing compound, phosphate compound and M salt is (1.2-1.8):(1.2-1.8):(3-4):(0.2-0.8); and/or time for the reaction is 5-10 hours.

Therefore, the second coating layer 12 (a coating layer of $Li_{1+x}M_xTi_{2-x}(PO_4)_3$) with excellent performance can be formed.

In some embodiments, in step S4, the inert atmosphere is $N_2$ or Ar.

Therefore, sintering can be performed in a common inert atmosphere.

In some embodiments, in step S4, a sintering condition is to maintain at 400-600° C. for 4-6 hours, then heat to 700-800° C. and maintain for 10-15 hours.

Therefore, a positive electrode active material synthesized by the sintering process has regular morphology and high crystallinity, and the first coating layer 11, the second coating layer 12, and the core 10 (the matrix) are closely bonded. In this case, the positive electrode active material has good structural stability, ensuring a high capacity, excellent rate performance, and excellent cycling performance.

Secondary Battery

An embodiment of this application provides a secondary battery, including the positive electrode active material in this application or the positive electrode active material prepared in the method in this application.

Usually, the secondary battery includes a positive electrode plate, a negative electrode plate, an electrolyte, and a separator. The positive electrode plate includes a positive electrode current collector and a positive electrode film layer provided on at least one surface of the positive electrode current collector. The positive electrode film layer includes a positive electrode active material. In the secondary battery in this application, the positive electrode film layer of the positive electrode plate includes the positive electrode active material in this application.

Electric Apparatus

An embodiment of this application provides an electric apparatus, including the secondary battery in this application.

The secondary battery may be used as a power source for the electric apparatus or an energy storage unit of the electric apparatus. The apparatus may include, but is not limited to, a mobile device (for example, a mobile phone or a notebook computer), an electric vehicle (for example, a battery electric vehicle, a hybrid electric vehicle, a plug-in hybrid electric vehicle, an electric bicycle, an electric scooter, an electric golf vehicle, or an electric truck), an electric train, a ship, a satellite, and an energy storage system.

EXAMPLES

The following describes examples of this application. The examples described below are exemplary and only used to explain this application, but cannot be construed as a limitation on this application. For an example for which no specific technique or condition is indicated, the technique or condition described in literature in the field or the product specification applies. The reagents or instruments used herein are all commercially available conventional products if no manufacturer is indicated.

Example 1

A positive electrode active material was prepared according to the following steps.

Step S1: Lithium acetate, ferric nitrate, and phosphoric acid were added to deionized water, with a molar ratio of lithium, iron, and phosphorus being 1:1:1, and the mixture was placed in a constant-temperature water bath and stirred to dissolve at 40° C. The pH of the solution was adjusted to 5 with an ammonia solution, and hydrogen peroxide and citric acid were added dropwise slowly. Then the solution was stirred for 2 hours for reaction.

Step S2: Ammonium titanyl oxalate and pyrrole were dispersed at a molar ratio of 1:1.4 by stirring into the solution obtained in step S1, and the solution was subjected to a polymerization reaction for 6 hours.

Step S3: After the polymerization reaction in step S2 ended, ammonium titanyl oxalate, phosphoric acid, and aluminum nitrate were added to the solution, when the solution became a white suspension, lithium oxalate was added with a molar ratio of the lithium, aluminum, titanium, and phosphorus added being 1.1:0.1:1.9:3, and the solution was stirred continuously for 5 hours.

Step S4: The water bath was heated to 80° C., and the solution was fully stirred until the water in the reaction system was completely evaporated. A sample dried was put into a mortar for grinding and then placed in a tube furnace for calcination. The tube furnace was heated to 500° C. in an Ar atmosphere and kept at that temperature for 5 hours, and then heated to 750° C. and kept there for 12 hours, to obtain the positive electrode active material of Example 1.

Testing was conducted to determine that the positive electrode active material of Example 1 was granular with a 3-layer structure. Its core was the positive electrode material which was lithium iron phosphate ($LiFePO_4$), the first coating layer on the surface of the core was a carbon coating layer co-doped with titanium and nitrogen, a molar ratio of Ti, N, and C in the first coating layer was 1:3.4:9.6, and the second coating layer on the surface of the first coating layer was $Li_{1.1}Al_{0.1}Ti_{1.9}(PO_4)_3$ as a solid electrolyte coating layer. The positive electrode active material had a median particle size $D_v50$ of 0.75 µm, a tap density of 1.2 $g/cm^3$, and a specific surface area of 11 $m^2/g$, with a mass ratio of the core, the first coating layer and the second coating layer being 1:0.3:0.8, and thicknesses of the first coating layer and the second coating layer being 10 nm and 50 nm respectively.

Example 2

In step S3, the molar ratio of lithium, aluminum, titanium, and phosphorus was changed to 1.2:0.2:1.8:3. Except for this, the positive electrode active material of Example 2 was prepared in the same method as that of Example 1.

Testing was conducted to determine that the positive electrode active material of Example 2 was granular with a 3-layer structure. Its core was the positive electrode material which was lithium iron phosphate ($LiFePO_4$), the first coating layer on the surface of the core was a carbon coating layer co-doped with titanium and nitrogen, with a molar ratio of Ti, N, and C being 1:3.4:9.6, and the second coating layer on the surface of the first coating layer was $Li_{1.2}Al_{0.2}Ti_{1.8}(PO_4)_3$ as a solid electrolyte coating layer. The positive electrode active material had a median particle size $D_v50$ of 0.65 µm, a tap density of 1.24 $g/cm^3$, and a specific surface area of 10.5 $m^2/g$, with a mass ratio of the core, the first coating layer and the second coating layer being 1:0.4: 0.65, and thicknesses of the first coating layer and the second coating layer being 15 nm and 45 nm respectively.

Example 3

In step S3, the molar ratio of lithium, aluminum, titanium, and phosphorus was changed to 1.5:0.5:1.5:3. Except for this, the positive electrode active material of Example 3 was prepared in the same method as that of Example 1.

Testing was conducted to determine that the positive electrode active material of Example 3 was granular with a 3-layer structure. Its core was the positive electrode material which was lithium iron phosphate ($LiFePO_4$), the first coating layer on the surface of the core was a carbon coating layer co-doped with titanium and nitrogen, with a molar ratio of Ti, N, and C in the first coating layer being 1:3.4:9.6, and the second coating layer on the surface of the first coating layer was $Li_{1.5}Al_{0.5}Ti_{1.5}(PO_4)_3$ as a solid electrolyte coating layer. The positive electrode active material had a median particle size $D_v50$ of 0.45 µm, a tap density of 1.32 $g/cm^3$, and a specific surface area of 11.2 $m^2/g$, with a mass ratio of the core, the first coating layer and the second coating layer being 1:0.28:0.56, and thicknesses of the first coating layer and the second coating layer being 13 nm and 33 nm respectively.

Example 4

In step S3, the molar ratio of lithium, aluminum, titanium, and phosphorus was changed to 1.7:0.7:1.3:3. Except for this, the positive electrode active material of Example 4 was prepared in the same method as that of Example 1.

Testing was conducted to determine that the positive electrode active material of Example 4 was granular with a 3-layer structure. Its core was the positive electrode material which was lithium iron phosphate ($LiFePO_4$), the first coating layer on the surface of the core was a carbon coating layer co-doped with titanium and nitrogen, with a molar ratio of Ti, N, and C in the first coating layer being 1:3.4:9.6, and the second coating layer on the surface of the first coating layer was $Li_{1.7}Al_{0.7}Ti_{1.3}(PO_4)_3$ as a solid electrolyte coating layer. The positive electrode active material had a median particle size $D_v50$ of 0.55 µm, a tap density of 1.35 $g/cm^3$, and a specific surface area of 9.5 $m^2/g$, with a mass ratio of the core, the first coating layer and the second coating layer being 1:0.35:0.4, and thicknesses of the first coating layer and the second coating layer being 15 nm and 25 nm respectively.

Example 5

In step S3, the molar ratio of lithium, aluminum, titanium, and phosphorus was changed to 1.8:0.8:1.2:3. Except for this, the positive electrode active material of Example 5 was prepared in the same method as that of Example 1.

Testing was conducted to determine that the positive electrode active material of Example 5 was granular with a 3-layer structure. Its core was the positive electrode material which was lithium iron phosphate ($LiFePO_4$), the first coating layer on the surface of the core was a carbon coating layer co-doped with titanium and nitrogen, with a molar ratio of Ti, N, and C in the first coating layer being 1:3.4:9.6, and the second coating layer on the surface of the first coating layer was $Li_{1.8}Al_{0.8}Ti_{1.2}(PO_4)_3$ as a solid electrolyte coating layer. The positive electrode active material had a median particle size $D_v50$ of 0.35 µm, a tap density of 1.3 $g/cm^3$, and a specific surface area of 9.8 $m^2/g$, with a mass ratio of the core, the first coating layer and the second coating layer being 1:0.32:0.35, and thicknesses of the first coating layer and the second coating layer being 12 nm and 20 nm respectively.

Example 6

In step S3, the molar ratio of lithium, aluminum, titanium, and phosphorus was changed to 1.9:0.9:1.1:3. Except for this, the positive electrode active material of Example 6 was prepared in the same method as that of Example 1.

Testing was conducted to determine that the positive electrode active material of Example 6 was granular with a 3-layer structure. Its core was the positive electrode material which was lithium iron phosphate ($LiFePO_4$), the first coating layer on the surface of the core was a carbon coating layer co-doped with titanium and nitrogen, with a molar ratio of Ti, N, and C in the first coating layer being 1:3.4:9.6, and the second coating layer on the surface of the first coating layer was $Li_{1.9}Al_{0.9}Ti_{1.1}(PO_4)_3$ as a solid electrolyte coating layer. The positive electrode active material had a median particle size $D_v50$ of 0.4 µm, a tap density of 1.28 g/cm$^3$, and a specific surface area of 10.8 m$^2$/g, with a mass ratio of the core, the first coating layer and the second coating layer being 1:0.35:0.2, and thicknesses of the first coating layer and the second coating layer being 13 nm and 10 nm respectively.

Example 7

In step S2, the molar ratio of ammonium titanyl oxalate and pyrrole was changed to 1:0.2, and in step S3, aluminum nitrate was changed to indium nitrate with the molar ratio of the lithium, indium, titanium, and phosphorus added being 1.5:0.5:1.5:3. Except for this, the positive electrode active material of Example 7 was prepared in the same method as that of Example 1.

Testing was conducted to determine that the positive electrode active material of Example 7 was granular with a 3-layer structure. Its core was the positive electrode material which was lithium iron phosphate (LiFePO$_4$), the first coating layer on the surface of the core was a carbon coating layer co-doped with titanium and nitrogen, with a molar ratio of Ti, N, and C in the first coating layer being 1:2.2:4.8, and the second coating layer on the surface of the first coating layer was $Li_{1.5}In_{0.5}Ti_{1.5}(PO_4)_3$ as solid electrolyte coating layer. The positive electrode active material had a median particle size $D_v50$ of 0.38 µm, a tap density of 1.3 g/cm$^3$, and a specific surface area of 9.2 m$^2$/g, with a mass ratio of the core, the first coating layer and the second coating layer being 1:0.18:0.55, and thicknesses of the first coating layer and the second coating layer being 5 nm and 34 nm respectively.

Example 8

In step S2, the molar ratio of ammonium titanyl oxalate and pyrrole was changed to 1:1, and in step S3, aluminum nitrate was changed to indium nitrate, with the molar ratio of the lithium, indium, titanium, and phosphorus added being 1.5:0.5:1.5:3. Except for this, the positive electrode active material of Example 8 was prepared in the same method as that of Example 1.

Testing was conducted to determine that the positive electrode active material of Example 8 was granular with a 3-layer structure. Its core was the positive electrode material which was lithium iron phosphate (LiFePO$_4$), the first coating layer on the surface of the core was a carbon coating layer co-doped with titanium and nitrogen, with a molar ratio of Ti, N, and C in the first coating layer being 1:3:8, and the second coating layer on the surface of the first coating layer was $Li_{1.5}In_{0.5}Ti_{1.5}(PO_4)_3$ as a solid electrolyte coating layer. The positive electrode active material had a median particle size $D_v50$ of 0.42 µm, a tap density of 1.3 g/cm$^3$, and a specific surface area of 11.3 m$^2$/g, with a mass ratio of the core, the first coating layer and the second coating layer being 1:0.25:0.52, and thicknesses of the first coating layer and the second coating layer being 8 nm and 32 nm respectively.

Example 9

In step S3, aluminum nitrate was changed to indium nitrate, with the molar ratio of the lithium, indium, titanium, and phosphorus added being 1.5:0.5:1.5:3. Except for this, the positive electrode active material of Example 9 was prepared in the same method as that of Example 1.

Testing was conducted to determine that the positive electrode active material of Example 9 was granular with a 3-layer structure. Its core was the positive electrode material which was lithium iron phosphate (LiFePO$_4$), the first coating layer on the surface of the core was a carbon coating layer co-doped with titanium and nitrogen, with a molar ratio of Ti, N, and C in the first coating layer being 1:3.4:9.6, and the second coating layer on the surface of the first coating layer was $Li_{1.5}In_{0.5}Ti_{1.5}(PO_4)_3$ as a solid electrolyte coating layer. The positive electrode active material had a median particle size $D_v50$ of 0.55 µm, a tap density of 1.3 g/cm$^3$, and a specific surface area of 10 m$^2$/g, with a mass ratio of the core, the first coating layer and the second coating layer being 1:0.3:0.5, and thicknesses of the first coating layer and the second coating layer being 10 nm and 30 nm respectively.

Example 10

In step S2, the molar ratio of ammonium titanyl oxalate and pyrrole was changed to 1:2.5, and in step S3, aluminum nitrate was changed to indium nitrate, with the molar ratio of the lithium, indium, titanium, and phosphorus added being 1.5:0.5:1.5:3. Except for this, the positive electrode active material of Example 10 was prepared in the same method as that of Example 1.

Testing was conducted to determine that the positive electrode active material of Example 10 was granular with a 3-layer structure. Its core was the positive electrode material which was lithium iron phosphate (LiFePO$_4$), the first coating layer on the surface of the core was a carbon coating layer co-doped with titanium and nitrogen, with a molar ratio of Ti, N, and C in the first coating layer being 1:4.5:14, and the second coating layer on the surface of the first coating layer was $Li_{1.5}In_{0.5}Ti_{1.5}(PO_4)_3$ as a solid electrolyte coating layer. The positive electrode active material had a median particle size $D_v50$ of 0.6 µm, a tap density of 1.36 g/cm$^3$, and a specific surface area of 9.5 m$^2$/g, with a mass ratio of the core, the first coating layer and the second coating layer being 1:0.4:0.52, and thicknesses of the first coating layer and the second coating layer being 15 nm and 34 nm respectively.

Example 11

In step S2, the molar ratio of ammonium titanyl oxalate and pyrrole was changed to 1:4.5, and in step S3, aluminum nitrate was changed to indium nitrate, with the molar ratio of the lithium, indium, titanium, and phosphorus added being 1.5:0.5:1.5:3. Except for this, the positive electrode active material of Example 11 was prepared in the same method as that of Example 1.

Testing was conducted to determine that the positive electrode active material of Example 11 was granular with a 3-layer structure. Its core was the positive electrode material which was lithium iron phosphate (LiFePO$_4$), the first coating layer on the surface of the core was a carbon coating layer co-doped with titanium and nitrogen, with a molar ratio of Ti, N, and C in the first coating layer being 1:6.5:22, and the second coating layer on the surface of the first coating layer was $Li_{1.5}In_{0.5}Ti_{1.5}(PO_4)_3$ as a solid electrolyte coating layer. The positive electrode active material had a median particle size $D_v50$ of 0.65 µm, a tap density of 1.32 g/cm$^3$, and a specific surface area was 9.8 m$^2$/g, with a mass ratio of the core, the first coating layer and the second coating layer being 1:0.6:0.56, and thicknesses of the first coating layer and the second coating layer being 20 nm and 32 nm respectively.

Example 12

In step S1, ferric nitrate was changed to manganese nitrate, with the molar ratio of the lithium, manganese, and phosphorus added being 1:1:1, and in step S3, aluminum nitrate was changed to indium nitrate, with the molar ratio of the lithium, indium, titanium, and phosphorus added being 1.5:0.5:1.5:3. Except for this, the positive electrode active material of Example 12 was prepared in the same method as that of Example 1.

Testing was conducted to determine that the positive electrode active material of Example 12 was granular with a 3-layer structure. Its core was the positive electrode material which was lithium manganese phosphate ($LiMnPO_4$) used as a positive electrode material, the first coating layer on the surface of the core was a carbon coating layer co-doped with titanium and nitrogen, with a molar ratio of Ti, N, and C in the first coating layer being 1:3.4:9.6, and the second coating layer on the surface of the first coating layer was $Li_{1.5}In_{0.5}Ti_{1.5}(PO_4)_3$ as a solid electrolyte coating layer. The positive electrode active material had a median particle size $D_v50$ of 0.62 μm, a tap density of 1.25 g/cm$^3$, and a specific surface area of 11.2 m$^2$/g, with a mass ratio of the core, the first coating layer and the second coating layer being 1:0.32:0.55, and thicknesses of the first coating layer and the second coating layer being 12 nm and 35 nm respectively.

Example 13

In step S1, lithium acetate, manganese nitrate, molybdenum nitrate, and phosphoric acid were added to deionized water, with the molar ratio of lithium, manganese, molybdenum, and phosphorus being 1:0.9:0.1:1, instead of adding lithium acetate, ferric nitrate, and phosphoric acid to the deionized water with the molar ratio of lithium, iron, and phosphorus being 1:1:1, and in step S3, aluminum nitrate was changed to indium nitrate, with the molar ratio of the lithium, indium, titanium, and phosphorus added being 1.5:0.5:1.5:3. Except for this, the positive electrode active material of Example 13 was prepared in the same method as that of Example 1.

Testing was conducted to determine that the positive electrode active material of Example 13 was granular with a 3-layer structure. Its core was the positive electrode material which was lithium manganese molybdenum phosphate ($LiMn_{0.9}Mo_{0.1}PO_4$) used as a positive electrode material, the first coating layer on the surface of the core was a carbon coating layer co-doped with titanium and nitrogen, with a molar ratio of Ti, N, and C in the first coating layer being 1:3.4:9.6, and the second coating layer on the surface of the first coating layer was $Li_{1.5}In_{0.5}Ti_{1.5}(PO_4)_3$ as a solid electrolyte coating layer. The positive electrode active material had a median particle size $D_v50$ of 0.55 μm, a tap density of 1.26 g/cm$^3$, and a specific surface area of 8.5 m$^2$/g, with a mass ratio of the core, the first coating layer and the second coating layer being 1:0.35:0.55, and thicknesses of the first coating layer and the second coating layer being 13 nm and 32 nm respectively.

Comparative Example 1

In step S2, ammonium titanyl oxalate was not added, and step S3 was omitted. Except for this, the positive electrode active material in Comparative Example 1 was prepared in the same method as that of Example 1.

Testing was conducted to determine that the positive electrode active material in Comparative Example 1 was granular with a 2-layer structure. Its core was the positive electrode material which was lithium iron phosphate ($LiFePO_4$), and only a nitrogen doped carbon coating layer (the first coating layer) was present on the surface of the core. The positive electrode active material had a median particle size $D_v50$ of 0.25 μm, a tap density of 1.15 g/cm$^3$, and a specific surface area of 12 m$^2$/g.

Comparative Example 2

In step S2, titanium dioxide and glucose, instead of ammonium titanyl oxalate and pyrrole, were dispersed at a molar ratio of 1:1.4 by stirring, and step S3 was omitted. Except for this, the positive electrode active material in Comparative Example 2 was prepared in the same method as that of Example 1.

Testing was conducted to determine that the positive electrode active material in Comparative Example 2 was granular with a 2-layer structure. Its core was the positive electrode material which was lithium iron phosphate ($LiFePO_4$), and only a titanium-doped carbon coating layer (the first coating layer) was present on the surface of the core. The positive electrode active material had a median particle size $D_v50$ of 0.3 μm, a tap density of 1.12 g/cm$^3$, and a specific surface area of 12.5 m$^2$/g.

Comparative Example 3

In step S2, titanium nitride and glucose, instead of ammonium titanyl oxalate and pyrrole, were dispersed at a molar ratio of 1:1.4 by stirring, and step S3 was omitted. Except for this, the positive electrode active material in Comparative Example 3 was prepared in the same method as that of Example 1.

Testing was conducted to determine that the positive electrode active material in Comparative Example 3 was granular with a 2-layer structure. Its core was the positive electrode material which was lithium iron phosphate ($LiFePO_4$), only a titanium nitride-doped carbon coating layer (the first coating layer) was present on the surface of the core, with the molar ratio of Ti, N, and C in the first coating layer being 1:1:8.4. The positive electrode active material had a median particle size $D_v50$ of 0.5 μm, a tap density of 1.2 g/cm$^3$, and a specific surface area of 13 m$^2$/g.

Comparative Example 4

Step S2 was omitted. Except for this, the positive electrode active material in Comparative Example 4 was prepared in the same method as that of Example 2.

Testing was conducted to determine that the positive electrode active material of Comparative Example 4 was granular with a 2-layer structure. Its core was the positive electrode material which was lithium iron phosphate ($LiFePO_4$), and only a solid electrolyte coating layer (the second coating layer) which was $Li_{1.2}Al_{0.2}Ti_{1.8}(PO_4)_3$ was present on the surface of the core. The positive electrode active material had a median particle size $D_v50$ of 0.35 μm, a tap density of 1.08 g/cm$^3$, and a specific surface area of 13.2 m$^2$/g.

The preparation conditions for the positive electrode active materials of Examples 1 to 13 and Comparative Examples 1 to 4 are listed in Table 1 below, and relevant parameters of these positive electrode active materials are listed in Table 2 below.

The positive electrode active materials obtained in the examples and comparative examples were all made into button cells and activated by charging and discharging at rates of 0.2C, 0.5C and 1C. Then charge-discharge cycling was performed on the button cells at 25° C. at a rate of 1C. The discharge capacity at 0.2C, first-cycle efficiency, discharge capacity at 1C, and cycling performance at room temperature were tested.

Methods for determination of the foregoing parameters are as below.

(1) Determination of Layered Structure of Positive Electrode Active Material and Chemical Composition of Each Layer The layered structure of the positive electrode active material, as well as chemical composition of each layer may be determined using a well-known method. For example, the layered structure can be determined by using a transmission electron microscopy and the chemical composition of each layer can be determined using an element surface scanning analysis.

(2) Determination of Mass of Each Layer of Positive Electrode Active Material

Mass of each layer of the positive electrode active material may be determined using a well-known method. For example, an inductively coupled plasma emission spectrometer and an ion polishing cross-sectional elemental analysis may be used for the determination.

(3) Determination of Thicknesses of Coating Layers

Thickness of a coating layer may be determined in a well-known method. For example, a high-resolution transmission electron microscopy may be used for the determination.

(4) Determination of $D_v50$ $D_v50$ of the positive electrode active material has a meaning well-known in the art, and may be determined using a method known in the art. For example, a laser particle size analyzer (for example, Malvern Master Size 3000) may be used for the determination according to the standard GB/T 19077.1-2016. In physics, $D_v50$ is defined as a particle size corresponding to 50% cumulative volume distribution of the positive electrode active material.

(5) Determination of Specific Surface Area

Specific surface area of the positive electrode active material has a meaning well-known in the art, and may be determined using a method known in the art. For example, testing may be performed in accordance with GB/T 19587-2017 using a nitrogen adsorption specific surface area analysis method, and calculation was made according to the BET (Brunauer Emmett Teller) method. The nitrogen adsorption specific surface area analysis may be performed by using a Tri-SEAR 3020 specific surface area and pore size analyzer from Micromeritics company of the United States.

(6) Determination of Tap Density

Tap density of the positive electrode active material has a meaning well-known in the art, and may be determined using a method known in the art. For example, testing may be performed using a powder tap density tester, in accordance with the standard GB/T 5162-2006.

(7) Electrochemical Performance Test

SP (carbon black) was used as a conductive agent, polyvinylidene fluoride (PVDF) as a binder, and N-methylpyrrolidone (NMP) as a solvent, where PVDF and NMP were prepared into an adhesive at a mass ratio of 2:8, and a positive electrode slurry was made from the positive electrode material, SP, and PVDF at a mass ratio of 90:7:3. The foregoing positive electrode slurry was uniformly applied on aluminum foil by using a spatula, and dried in a vacuum oven at 100° C. for 12 hours. Then, the aluminum foil was punched into a wafer with a diameter of 12 mm, a metal lithium sheet was used as a negative electrode, a Celgard 2325 separator was used, and an EC/DMC (at a volume ratio of 1:1) solution with a $LiPF_6$ concentration of 1.0 mol/L was used as an electrolyte.

A half CR2032 button cell prepared in the step above was placed on a LAND tester, activated by charging and discharging at rates of 0.2C, 0.5C and 1C, and subjected to then charge-discharged cycling at 25° C. at a rate of 1C. A charge-discharge voltage range of the positive electrode active materials with a core being lithium iron phosphate was 2.5-3.75 V, and the charge-discharge voltage range of the positive electrode active materials with a core being lithium manganese phosphate or lithium manganese molybdenum phosphate was 2.5-4.5 V.

TABLE 1

Preparation conditions for the positive electrode active materials in the examples and comparative examples

| | Types and amounts of materials of core (step S1) | | | | | Types and amounts of materials of first coating layer (step S2) | | | Molar ratio of titanium-containing compound | Types and amounts of materials of second coating layer (step S3) | | | | |
|---|---|---|---|---|---|---|---|---|---|---|---|---|---|---|
| No. | Lithium salt | A salt | B salt | Phosphate compound | Molar ratio of elements | Titanium-containing compound | Nitrogen-containing organic compound | and nitrogen-containing organic compound | | Lithium salt | M salt | Water-soluble titanium-containing compound | Phosphate compound | Molar ratio of elements |
| Example 1 | Lithium acetate | Ferric nitrate | / | Phosphoric acid | Li:Fe:P = 1:1:1 | Ammonium titanyl oxalate | Pyrrole | | 1:1.4 | Lithium oxalate | Aluminum nitrate | Ammonium titanyl oxalate | Phosphoric acid | Li:Al:Ti:P = 1.1:0.1:1.9:3 |
| Example 2 | Lithium acetate | Ferric nitrate | / | Phosphoric acid | Li:Fe:P = 1:1:1 | Ammonium titanyl oxalate | Pyrrole | | 1:1.4 | Lithium oxalate | Aluminum nitrate | Ammonium titanyl oxalate | Phosphoric acid | Li:Al:Ti:P = 1.2:0.2:1.8:3 |

TABLE 1-continued

Preparation conditions for the positive electrode active materials in the examples and comparative examples

| No. | Lithium salt | A salt | B salt | Phosphate compound | Molar ratio of elements | Titanium-containing compound | Nitrogen-containing organic compound | Molar ratio of titanium-containing and nitrogen-containing organic compound | Lithium salt | M salt | Water-soluble titanium-containing compound | Phosphate compound | Molar ratio of elements |
|---|---|---|---|---|---|---|---|---|---|---|---|---|---|
| Example 3 | Lithium acetate | Ferric nitrate | / | Phosphoric acid | Li:Fe:P = 1:1:1 | Ammonium titanyl oxalate | Pyrrole | 1:1.4 | Lithium oxalate | Aluminum nitrate | Ammonium titanyl oxalate | Phosphoric acid | Li:Al:Ti:P = 1.5:0.5:1.5:3 |
| Example 4 | Lithium acetate | Ferric nitrate | / | Phosphoric acid | Li:Fe:P = 1:1:1 | Ammonium titanyl oxalate | Pyrrole | 1:1.4 | Lithium oxalate | Aluminum nitrate | Ammonium titanyl oxalate | Phosphoric acid | Li:Al:Ti:P = 1.7:0.7:1.3:3 |
| Example 5 | Lithium acetate | Ferric nitrate | / | Phosphoric acid | Li:Fe:P = 1:1:1 | Ammonium titanyl oxalate | Pyrrole | 1:1.4 | Lithium oxalate | Aluminum nitrate | Ammonium titanyl oxalate | Phosphoric acid | Li:Al:Ti:P = 1.8:0.8:1.2:3 |
| Example 6 | Lithium acetate | Ferric nitrate | / | Phosphoric acid | Li:Fe:P = 1:1:1 | Ammonium titanyl oxalate | Pyrrole | 1:1.4 | Lithium oxalate | Aluminum nitrate | Ammonium titanyl oxalate | Phosphoric acid | Li:Al:Ti:P = 1.9:0.9:1.1:3 |
| Example 7 | Lithium acetate | Ferric nitrate | / | Phosphoric acid | Li:Fe:P = 1:1:1 | Ammonium titanyl oxalate | Pyrrole | 1:0.2 | Lithium oxalate | Indium nitrate | Ammonium titanyl oxalate | Phosphoric acid | Li:In:Ti:P = 1.5:0.5:1.5:3 |
| Example 8 | Lithium acetate | Ferric nitrate | / | Phosphoric acid | Li:Fe:P = 1:1:1 | Ammonium titanyl oxalate | Pyrrole | 1:1 | Lithium oxalate | Indium nitrate | Ammonium titanyl oxalate | Phosphoric acid | Li:In:Ti:P = 1.5:0.5:1.5:3 |
| Example 9 | Lithium acetate | Ferric nitrate | / | Phosphoric acid | Li:Fe:P = 1:1:1 | Ammonium titanyl oxalate | Pyrrole | 1:1.4 | Lithium oxalate | Indium nitrate | Ammonium titanyl oxalate | Phosphoric acid | Li:In:Ti:P = 1.5:0.5:1.5:3 |
| Example 10 | Lithium acetate | Ferric nitrate | / | Phosphoric acid | Li:Fe:P = 1:1:1 | Ammonium titanyl oxalate | Pyrrole | 1:2.5 | Lithium oxalate | Indium nitrate | Ammonium titanyl oxalate | Phosphoric acid | Li:In:Ti:P = 1.5:0.5:1.5:3 |
| Example 11 | Lithium acetate | Ferric nitrate | / | Phosphoric acid | Li:Fe:P = 1:1:1 | Ammonium titanyl oxalate | Pyrrole | 1:4.5 | Lithium oxalate | Indium nitrate | Ammonium titanyl oxalate | Phosphoric acid | Li:In:Ti:P = 1.5:0.5:1.5:3 |
| Example 12 | Lithium acetate | Manganese nitrate | / | Phosphoric acid | Li:Mn:P = 1:1:1 | Ammonium titanyl oxalate | Pyrrole | 1:1.4 | Lithium oxalate | Indium nitrate | Ammonium titanyl oxalate | Phosphoric acid | Li:In:Ti:P = 1.5:0.5:1.5:3 |
| Example 13 | Lithium acetate | Manganese nitrate | Molybdenum nitrate | Phosphoric acid | Li:Mn:Mo:P = 1:0.9:0.1:1 | Ammonium titanyl oxalate | Pyrrole | 1:1.4 | Lithium oxalate | Indium nitrate | Ammonium titanyl oxalate | Phosphoric acid | Li:In:Ti:P = 1.5:0.5:1.5:3 |
| Comparative Example 1 | Lithium acetate | Ferric nitrate | / | Phosphoric acid | Li:Fe:P = 1:1:1 | / | Pyrrole | / | / | / | / | / | / |
| Comparative Example 2 | Lithium acetate | Ferric nitrate | / | Phosphoric acid | Li:Fe:P = 1:1:1 | Titanium dioxide | Glucose | 1:1.4 | / | / | / | / | / |
| Comparative Example 3 | Lithium acetate | Ferric nitrate | / | Phosphoric acid | Li:Fe:P = 1:1:1 | Titanium nitride | Glucose | 1:1.4 | / | / | / | / | / |

TABLE 1-continued

Preparation conditions for the positive electrode active materials in the examples and comparative examples

| No. | Types and amounts of materials of core (step S1) | | | | | Types and amounts of materials of first coating layer (step S2) | | | | Types and amounts of materials of second coating layer (step S3) | | | | |
|---|---|---|---|---|---|---|---|---|---|---|---|---|---|---|
| | Lithium salt | A salt | B salt | Phosphate compound | Molar ratio of elements | Titanium-containing compound | Nitrogen-containing organic compound | Molar ratio of titanium-containing and nitrogen-containing organic compound | | Lithium salt | M salt | Water-soluble titanium-containing compound | Phosphate compound | Molar ratio of elements |
| Comparative Example 4 | Lithium acetate | Ferric nitrate | / | Phosphoric acid | Li:Fe:P = 1:1:1 | / | / | / | | Lithium oxalate | Aluminum nitrate | Ammonium titanyl oxalate | Phosphoric acid | Li:Al:Ti:P = 1.2:0.2:1.8:3 |

TABLE 2

Parameters of positive electrode active materials obtained in the examples and comparative examples and performance parameters of batteries prepared therefrom

| No. | Parameters of positive electrode active material | | | | | | | | | | Parameters of battery performance | | | |
|---|---|---|---|---|---|---|---|---|---|---|---|---|---|---|
| | Composition of core | Composition of first coating layer | Molar ratio of Ti, N, and C in first coating layer | Composition of second coating layer | Median particle size $D_v50$ (μm) | Tap density (g/cm³) | Specific surface area (m²/g) | Mass ratio of layers (core:first coating layer:second coating layer) | Thicknesses of coating layers (first coating layer/second coating layer) (nm) | Button cell capacity at 0.2 C (mAh/g) | First-cycle efficiency (%) | Button cell capacity at 1 C (mAh/g) | Capacity retention rate after 200 cycles at 25° C. (%) |
| Example 1 | $LiFePO_4$ | Carbon coating layer co-doped with titanium and nitrogen | 1:3:4:9.6 | $Li_{1.1}Al_{0.1}Ti_{1.9}(PO_4)_3$ | 0.75 | 1.2 | 11 | 1:0.3:0.8 | 10/50 | 148.5 | 92.3 | 138.1 | 87.2 |
| Example 2 | $LiFePO_4$ | Carbon coating layer co-doped with titanium and nitrogen | 1:3:4:9.6 | $Li_{1.2}Al_{0.2}Ti_{1.8}(PO_4)_3$ | 0.65 | 1.24 | 10.5 | 1:0.4:0.65 | 15/45 | 157.3 | 96.5 | 147.3 | 90.2 |
| Example 3 | $LiFePO_4$ | Carbon coating layer co-doped with titanium and nitrogen | 1:3:4:9.6 | $Li_{1.5}Al_{0.5}Ti_{1.5}(PO_4)_3$ | 0.45 | 1.32 | 11.2 | 1:0.28:0.56 | 13/33 | 160.2 | 95.6 | 150.2 | 92.8 |
| Example 4 | $LiFePO_4$ | Carbon coating layer co-doped with titanium and nitrogen | 1:3:4:9.6 | $Li_{1.7}Al_{0.7}Ti_{1.3}(PO_4)_3$ | 0.55 | 1.35 | 9.5 | 1:0.35:0.4 | 15/25 | 154.3 | 95.6 | 144.5 | 91.2 |
| Example 5 | $LiFePO_4$ | Carbon coating layer co-doped with titanium and nitrogen | 1:3:4:9.6 | $Li_{1.8}Al_{0.8}Ti_{1.2}(PO_4)_3$ | 0.35 | 1.3 | 9.8 | 1:0.32:0.35 | 12/20 | 155.6 | 95.8 | 145.7 | 90.2 |
| Example 6 | $LiFePO_4$ | Carbon coating layer co-doped with titanium and nitrogen | 1:3:4:9.6 | $Li_{1.9}Al_{0.9}Ti_{1.1}(PO_4)_3$ | 0.4 | 1.28 | 10.8 | 1:0.35:0.2 | 13/10 | 142.5 | 90.5 | 132.4 | 87.3 |
| Example 7 | $LiFePO_4$ | Carbon coating layer co-doped with titanium and nitrogen | 1:2:2:4.8 | $Li_{1.5}In_{0.5}Ti_{1.5}(PO_4)_3$ | 0.38 | 1.3 | 9.2 | 1:0.18:0.55 | 5/34 | 154.8 | 95.3 | 144.2 | 90.2 |
| Example 8 | $LiFePO_4$ | Carbon coating layer co-doped | 1:3:8 | $Li_{1.5}In_{0.5}Ti_{1.5}(PO_4)_3$ | 0.42 | 1.3 | 11.3 | 1:0.25:0.52 | 8/32 | 163.2 | 97.6 | 153.3 | 95.2 |

TABLE 2-continued

Parameters of positive electrode active materials obtained in the examples and comparative examples and performance parameters of batteries prepared therefrom

| No. | Composition of core | Composition of first coating layer | Molar ratio of Ti, N, and C in first coating layer | Composition of second coating layer | Median particle size $D_v50$ (μm) | Tap density (g/cm³) | Specific surface area (m²/g) | Mass ratio of layers (core:first coating layer:second coating layer) | Thicknesses of coating layers (first coating layer/second coating layer) (nm) | Button cell capacity at 0.2 C (mAh/g) | First-cycle efficiency (%) | Button cell capacity at 1 C (mAh/g) | Capacity retention rate after 200 cycles at 25° C. (%) |
|---|---|---|---|---|---|---|---|---|---|---|---|---|---|
| Example 9 | LiFePO₄ | Carbon coating layer co-doped with titanium and nitrogen | 1:3.4:9.6 | Li$_{1.5}$In$_{0.5}$Ti$_{1.5}$(PO$_4$)$_3$ | 0.55 | 1.3 | 10 | 1:0.3:0.5 | 10/30 | 167.8 | 98.8 | 157.2 | 96.5 |
| Example 10 | LiFePO₄ | Carbon coating layer co-doped with titanium and nitrogen | 1:4.5:14 | Li$_{1.5}$In$_{0.5}$Ti$_{1.5}$(PO$_4$)$_3$ | 0.6 | 1.36 | 9.5 | 1:0.4:0.52 | 15/34 | 164.2 | 97.5 | 154.7 | 95.6 |
| Example 11 | LiFePO₄ | Carbon coating layer co-doped with titanium and nitrogen | 1:6.5:22 | Li$_{1.5}$In$_{0.5}$Ti$_{1.5}$(PO$_4$)$_3$ | 0.65 | 1.32 | 9.8 | 1:0.6:0.56 | 20/32 | 150.3 | 93.2 | 140.8 | 89.5 |
| Example 12 | LiMnPO₄ | Carbon coating layer co-doped with titanium and nitrogen | 1:3.4:9.6 | Li$_{1.5}$In$_{0.5}$Ti$_{1.5}$(PO$_4$)$_3$ | 0.62 | 1.25 | 11.2 | 1:0.32:0.55 | 12/35 | 156.2 | 94.8 | 146.6 | 90.2 |
| Example 13 | LiMn$_{0.9}$Mo$_{0.1}$PO$_4$ | Carbon coating layer co-doped with titanium and nitrogen | 1:3.4:9.6 | Li$_{1.5}$In$_{0.5}$Ti$_{1.5}$(PO$_4$)$_3$ | 0.55 | 1.26 | 8.5 | 1:0.35:0.55 | 13/32 | 162.3 | 97.3 | 152.1 | 92.3 |
| Comparative example 1 | LiFePO₄ | Nitrogen doped carbon coating layer | / | / | 0.25 | 1.15 | 12 | / | / | 145.8 | 91.6 | 135.5 | 85.2 |
| Comparative example 2 | LiFePO₄ | Titanium doped carbon coating layer | / | / | 0.3 | 1.12 | 12.5 | / | / | 148.2 | 92.5 | 138.4 | 84.3 |
| Comparative example 3 | LiFePO₄ | Titanium nitride doped carbon coating layer | 1:1:8.4 | / | 0.5 | 1.2 | 13 | / | / | 146.2 | 91.8 | 136.9 | 86.8 |
| Comparative example 4 | LiFePO₄ | / | / | Li$_{1.2}$In$_{0.2}$Ti$_{1.8}$(PO$_4$)$_3$ | 0.35 | 1.08 | 13.2 | / | / | 140.2 | 90.5 | 130.8 | 78.8 |

Through comparisons between Examples 1 to 13 and Comparative Examples 1 to 4, it can be seen that batteries prepared using the positive electrode active materials with a core-shell structure of the present invention had obviously better electrical performance.

It can be seen from the results of comparisons between the examples and Comparative Examples 1 to 4 that if only a carbon coating layer (the first coating layer) or a coating layer of lithium aluminum titanium phosphate or lithium titanium indium phosphate (the second coating layer) is formed, synergy between the first coating layer and the second coating layer cannot be effectively exploited. In addition, the electronic and ionic conductivities of the lithium-containing phosphate as a positive electrode material are significantly reduced, which affect the extractable capacity of the positive electrode material and degrades the cycling performance.

In Example 1, the doping amount of metal M (aluminum) in step S3 is excessively small, and in Example 6, the doping amount of metal M (aluminum) is excessively large. It can be seen from the test results of Examples 1 and 6 that if an excessively small or large amount of doping of metal M was used in step S3, the battery prepared by using the positive electrode active material of the present invention will have degraded capacity, rate performance, and cycling performance.

In Example 7, an excessively small amount of pyrrole is added in step S2, and in Example 11, an excessively large amount of pyrrole is added in step S2. As a result, the ratio of carbon and nitrogen is excessively low or high in the carbon coating layer, which affects coating effects of the coating layers, thereby reducing the electronic and ionic conductivity of the material. As a result, electrical performance cannot be effectively exploited.

It should be noted that this application is not limited to the foregoing embodiments. The foregoing embodiments are merely examples, and embodiments with substantially the same technical concept and same functions within the scope of the technical solution in this application all fall into the technical scope of this application. In addition, other manners formed by applying various modifications that can be figured out by a person skilled in the art to the embodiments and by combining some elements of the embodiments without departing from the essence of this application also fall into the scope of this application.

The invention claimed is:

1. A positive electrode active material, comprising:
a core, wherein the core is a lithium-containing phosphate;
a first coating layer, disposed on at least part of surface of the core, wherein the first coating layer is a carbon coating layer co-doped with titanium and nitrogen; and
a second coating layer, disposed on at least part of surface of the first coating layer, wherein the second coating layer comprises $Li_{1+x}M_xTi_{2-x}(PO_4)_3$, wherein M is at least one element selected from aluminum, lanthanum, indium, zirconium, gallium, and scandium, and $0.2 \leq x \leq 0.8$.

2. The positive electrode active material according to claim 1, wherein
the lithium-containing phosphate comprises at least one of compounds represented by $LiA_yB_{1-y}PO_4$, wherein A is one or more of iron, nickel, cobalt, or manganese, B is one or more of vanadium, copper, molybdenum, titanium, tungsten, zinc, yttrium, zirconium, or magnesium, and $0.8 \leq y \leq 1$.

3. The positive electrode active material according to claim 1, wherein
in the first coating layer, a molar ratio of titanium, nitrogen, and carbon is 1:(2.5–5):(6–16).

4. The positive electrode active material according to claim 3, wherein the molar ratio of titanium, nitrogen, and carbon is 1:(3-4.5):(8-14).

5. The positive electrode active material according to claim 1, wherein
M is at least one element selected from indium, gallium, and scandium.

6. The positive electrode active material according to claim 1, wherein
a mass ratio of the core, the first coating layer, and the second coating layer is 1:(0.2-0.5):(0.3-0.7).

7. The positive electrode active material according to claim 1, wherein
a thickness of the first coating layer is 5 nm-20 nm; or
a thickness of the second coating layer is 10 nm-60 nm.

8. The positive electrode active material according to claim 1, wherein
a thickness of the first coating layer is 8 nm-15 nm; or
a thickness of the second coating layer is 15 nm-50 nm.

9. The positive electrode active material according to claim 1, wherein
a median particle size $D_v50$ of the positive electrode active material is 0.25 μm-0.85 μm.

10. The positive electrode active material according to claim 9, wherein the median particle size $D_v50$ of the positive electrode active material is 0.35 μm-0.65 μm.

11. The positive electrode active material according to claim 1, wherein
a tap density of the positive electrode active material is 1.2 g/cm$^3$-1.4 g/cm$^3$.

12. The positive electrode active material according to claim 11, wherein
the tap density of the positive electrode active material is 1.25 g/cm$^3$-1.35 g/cm$^3$.

13. The positive electrode active material according to claim 1, wherein
a specific surface area of the positive electrode active material is 8 m$^2$/g-12 m$^2$/g.

14. The positive electrode active material according to claim 13, wherein
the specific surface area of the positive electrode active material is 9 m$^2$/g-10 m$^2$/g.

15. A preparation method of a positive electrode active material, comprising the following steps:
step S1: letting a lithium salt, a phosphate compound, an A salt react in a solution;
step S2: dispersing a titanium-containing compound and a nitrogen-containing organic compound into the solution obtained in step S1 for a polymerization reaction;
step S3: adding a second titanium-containing compound, a second phosphate compound, and an M salt after the polymerization reaction in step S2 ends, and when the solution becomes a suspension, adding a second lithium salt and stirring continuously; and
step S4: completely evaporating solvent in a reaction system, grinding a resulting product, and sintering the resulting product in an inert atmosphere to obtain the positive electrode active material;
wherein the positive electrode active material comprises:
a core, wherein the core is a lithium-containing phosphate; a first coating layer disposed on at least part of surface of the core, wherein the first coating layer is a carbon coating layer co-doped with titanium and nitrogen; and a second coating layer disposed on at least part of surface of the first coating layer, wherein the second coating layer comprises $Li_{1+x}M_xTi_{2-x}(PO_4)_3$, wherein M is at least one element selected from aluminum, lanthanum, indium, zirconium, gallium, and scandium, and $0.2 \leq x \leq 0.8$.

16. The method according to claim 15, wherein

In step S1, pH of the solution of the lithium salt, the phosphate compound, the A salt, is adjusted to 4-6, and an oxidizing agent and a complexing agent are added to the aqueous solution for reaction, wherein the A salt is one or more of a sulfate, a nitrate, or a chloride of iron, nickel, cobalt, or manganese;

the B salt is one or more of a nitrate, a chloride, or an acetate of vanadium, copper, molybdenum, titanium, tungsten, zinc, yttrium, zirconium, or magnesium;

the phosphate compound is one or more of phosphoric acid, ammonium dihydrogen phosphate, and diammonium hydrogen phosphate; or the lithium salt is one or more of lithium oxalate, lithium hydroxide, and lithium acetate.

17. The method according to claim 16, wherein
in step S2, the titanium-containing compound is ammonium titanyl oxalate.

18. The method according to claim 16, wherein
in step S3, the M salt is at least one of a nitrate, a chloride, or an acetate of aluminum, lanthanum, indium, zirconium, gallium or scandium; and/or the phosphate compound is a combination of one or more of phosphoric acid, ammonium dihydrogen phosphate, and diammonium hydrogen phosphate; or the titanium-containing compound is ammonium titanyl oxalate, and the lithium salt is a combination of one or more of lithium oxalate, lithium hydroxide, and lithium acetate.

19. The method according to claim 16, wherein in step S2, a molar ratio of the titanium-containing compound and the nitrogen-containing organic compound is 1:(1-2.5); and time for the polymerization reaction is 3-8 hours;

in step S3, a molar ratio of lithium, titanium, phosphorus and M element in the lithium salt, titanium-containing compound, phosphate compound and M salt is (1.2-1.8):(1.2-1.8):(3-4):(0.2-0.8); and time for a reaction is 5-10 hours; and in step S4, the inert atmosphere is $N_2$ or Ar; and a sintering condition is to maintain at 400-600° C. for 4-6 hours, then heat to 700-800° C. and maintain for 10-15 hours.

20. A secondary battery, comprising:

the positive electrode active material according to claim 1, or the positive electrode active material prepared in the method according to claim 16.

* * * * *